United States Patent
Hartl

(10) Patent No.: US 10,541,392 B2
(45) Date of Patent: Jan. 21, 2020

(54) FEED-THROUGH

(71) Applicant: Schott AG, Mainz (DE)

(72) Inventor: Helmut Hartl, Vienna (AT)

(73) Assignee: Schott AG, Mainz (DE)

(*) Notice: Subject to any disclaimer, the term of this patent is extended or adjusted under 35 U.S.C. 154(b) by 282 days.

(21) Appl. No.: 15/485,908

(22) Filed: Apr. 12, 2017

(65) Prior Publication Data

US 2017/0222195 A1     Aug. 3, 2017

Related U.S. Application Data

(63) Continuation of application No. PCT/EP2015/075065, filed on Oct. 29, 2015.

(30) Foreign Application Priority Data

Nov. 11, 2014     (DE) .................. 10 2014 016 600

(51) Int. Cl.
*H01M 2/06* (2006.01)
*H01G 2/10* (2006.01)
(Continued)

(52) U.S. Cl.
CPC ............. *H01M 2/065* (2013.01); *C03C 3/19* (2013.01); *C03C 8/08* (2013.01); *C03C 8/10* (2013.01); *C03C 8/24* (2013.01); *C03C 10/0054* (2013.01); *H01G 9/10* (2013.01); *C03C 2204/00* (2013.01); *C03C 2207/08* (2013.01); *C03C 2207/10* (2013.01)

(58) Field of Classification Search
None
See application file for complete search history.

(56) References Cited

U.S. PATENT DOCUMENTS 961,672 A    6/1910 Bamhurst
3,600,017 A    8/1971 Scherer
(Continued)

FOREIGN PATENT DOCUMENTS

CN     200962441 Y  * 10/2007
DE     101 05 877 A1     8/2001
(Continued)

OTHER PUBLICATIONS

English abstract for CN 200962441Y (Year: 2007).*
(Continued)

*Primary Examiner* — Sin J Lee
(74) *Attorney, Agent, or Firm* — Taylor IP, P.C.

(57) ABSTRACT

A feed-through through a housing part of a housing, for example of a battery or a capacitor made of a metal, wherein the housing part has at least one opening, through which at least one conductor is fed in a glass or glass ceramic material, and wherein the conductor has at least two sections in the axial direction, a first section made of a first material, e.g. aluminium, and a second section made of a second material, e.g. copper, as well as a transition from the first to the second material, and wherein the transition from the first to the second material is located in the region of the glass or glass ceramic material, said glass or glass ceramic material being adapted to the metal of the housing in such a way that a compression glass-to-metal seal is formed.

14 Claims, 1 Drawing Sheet

(51) Int. Cl.
*H01G 9/10* (2006.01)
*H01M 10/052* (2010.01)
*C03C 8/24* (2006.01)
*C03C 8/10* (2006.01)
*C03C 8/08* (2006.01)
*C03C 3/19* (2006.01)
*C03C 10/00* (2006.01)
*C03C 3/145* (2006.01)

(56) References Cited

U.S. PATENT DOCUMENTS

| | | | |
|---|---|---|---|
| 5,773,959 A | 6/1998 | Merritt et al. | |
| 5,849,434 A | 12/1998 | Miura et al. | |
| 5,853,914 A | 12/1998 | Kawakami | |
| 5,874,185 A | 2/1999 | Wang et al. | |
| 5,900,183 A | 5/1999 | Kronfli et al. | |
| 5,952,126 A | 9/1999 | Lee et al. | |
| 2003/0116234 A1* | 6/2003 | Santella | B23K 35/0266 148/437 |
| 2013/0330603 A1* | 12/2013 | Kroll | C03C 3/19 429/179 |
| 2014/0212741 A1 | 7/2014 | Kim | |
| 2015/0124401 A1* | 5/2015 | Prest | C22C 1/002 361/679.55 |

FOREIGN PATENT DOCUMENTS

| | | |
|---|---|---|
| DE | 10 2012 005 220 A1 | 10/2012 |
| DE | 10 2013 006 463 A1 | 10/2014 |
| EP | 2 371 419 A2 | 10/2011 |
| JP | 58-42170 A | 3/1983 |
| JP | 09-35748 A | 2/1997 |
| JP | 2007-134233 A | 5/2007 |
| WO | 2012/110242 A1 | 8/2012 |
| WO | 2012/110244 A1 | 8/2012 |
| WO | 2012/110246 A1 | 8/2012 |
| WO | 2012/167921 A1 | 12/2012 |

OTHER PUBLICATIONS

PDF file for the website page (www.engineeringtoolbox.com) (Year unknown).*
JPO English abstract for JP58-42170 (Okazaki et al). (Year: 1983).*
International Preliminary Report on Patentability dated Jan. 13, 2017 for International Application No. PCT/EP2015/075065 (15 pages).
International Search Report dated Jan. 13, 2016 for International Application No. PCT/EP2015/075065 (6 pages).
"Handbook of Batteries", published by David Linden, 2nd issue, McGrawhill, 1995, Chapter 36 & 39 (88 pages).

* cited by examiner

FEED-THROUGH

CROSS REFERENCE TO RELATED APPLICATIONS

This is a continuation of PCT application No. PCT/EP2015/075065, entitled "FEED-THROUGH", filed Oct. 29, 2015, which is incorporated herein by reference.

BACKGROUND OF THE INVENTION

1. Field of the Invention

The present invention relates to a feed-through, and, more particularly, to a feed-through through a housing part of a housing for example of a storage device, for example a battery or a capacitor made of metal, in particular a light metal, for example aluminum or an aluminum alloy, AlSiC, magnesium, a magnesium alloy, titanium, a titanium alloy, steel, stainless steel or high grade steel, and a housing for an electric storage device, for example a battery or a capacitor having such a feed-through, and a storage device such as a capacitor with a housing according to the invention.

2. Description of the Related Art

Storage devices such as batteries are understood to be disposable batteries which are disposed of and/or recycled after discharge, as well as accumulators. Accumulators, preferably lithium-ion batteries are intended for various applications, for example for portable electronic equipment, cell phones, power tools and in particular electric vehicles. The batteries can replace traditional energy sources, for example lead-acid batteries, nickel-cadmium batteries or nickel-metal hydride batteries.

Lithium-ion batteries have been known for many years. For example, as described in the "Handbook of Batteries, published by David Linden, 2nd issue, McGrawhill, 1995, chapter 36 and 39".

Various aspects of lithium-ion batteries are described in a multitude of patents, for example U.S. Pat. Nos. 961,672, 5,952,126, 5,900,183, 5,874,185, 5,849,434, 5,853,914 as well as 5,773,959.

Lithium-ion batteries, in particular for applications in the automobile industry generally feature a multitude of individual battery cells which are generally connected in-series. The in-series connected battery cells are combined into so-called battery packs and several battery packs are then combined into a battery module which is also referred to as lithium-ion battery. Each individual battery cell has electrodes which are led out of a housing of the battery cell.

In the use of lithium-ion batteries in the automobile industry, a multitude of problems such as corrosion resistance, stability in accidents or vibration resistance must be solved. An additional problem is the hermeticity over an extended period.

The hermeticity may, for example, be compromised by leakage in the area of the electrodes of the battery cell or respectively the electrode feed-through in the battery cell. Such leakages may, for example, be caused by temperature changes and alternating mechanical stresses, for example vibrations in the vehicle or aging of the synthetic material.

A short-circuit or temperature change in the battery or respectively battery cell can lead to a reduced life span of the battery or the battery cell.

To ensure better stability in accidents, a housing for a lithium-ion battery is suggested, for example, in DE 101 05 877 A1, whereby the housing includes a metal jacket which is open on both sides and which is being sealed.

The power connection or respectively the electrodes are insulated by plastic. Disadvantages of plastic insulation may include the limited temperature resistance, the limited mechanical stability, aging and the uncertain hermeticity over the service life.

The feed-throughs in the lithium-ion batteries according to the current state of the art are therefore not integrated hermetically sealed into the cover part of the lithium-ion battery. At a pressure difference of 1 bar, a helium leakage rate of max. $1 \cdot 10^{-6}$ mbar 1 s$^{-1}$, dependent upon inspection specification, is normally attained in the current state of the art. Moreover, the electrodes are crimped and laser welded connecting components with additional insulators are arranged in the interior of the battery.

Feed-throughs are known from WO 2012/167921, WO 2012/110242, WO 2012/110246, WO 2012/110244 that lead through a housing part of a housing for a storage device. In the feed-throughs, a cross section in a glass or glass ceramic material is guided through the opening.

When used in a storage device, two feed-throughs with conductors are provided as a general rule, namely at least one conductor that serves as a cathode and at least one additional conductor that serves as an anode of the electrochemical cell. The materials of the anode or respectively the cathode differ from one another. Copper or a copper alloy is used for the pin type conductor, if the pin type conductor is being connected to a cathode of the electrochemical cell or battery cell and aluminum (Al) or an aluminum alloy is used, if the conductor is being connected to an anode. Other materials are also possible, as described in WO 2012/167921, the disclosure content of which is included into the current application in its entirety.

With the electrochemical cell in WO 2012/167921 the problem exists, that the outside connection of the storage device or respectively the battery cell includes two different materials which can be detrimental, particularly when connecting several battery cells with each other.

EP 2 371 419 A2 illustrates an electric feed-through of a capacitor for medical implants, as well as methods for production and use of the same. It is described in EP 2 371 419 A2 that the connecting pin consists of two pin sections; a first pin section consisting of Pt, Pt/Ir, FeNi, FeNiCo, FeCr, Nb, Ta, Mo, W, Cr, FeCr, V or Fi and a second pin section that includes aluminum. However, Cu is not mentioned in EP 2 371 419 A2 as a material for the first pin section. Moreover, no values for the thermal coefficient of expansion α are stated in EP 2 371 419 A2. In addition, a hermetically sealed feed-through cannot be achieved with the glasses specified in EP 2 371 419 A2, because the thermal expansion of the glasses is too small for this.

DE 10 2013 006 463 describes a feed-through for a battery, such as a lithium-ion battery. However, the pin-shaped conductor consists of one single material.

What is needed in the art is a feed-through that avoids the problems of the current state of the art.

SUMMARY OF THE INVENTION

The present invention provides a feed-through, for example through a component of a housing, provides for example, of a storage device a battery, or a capacitor made of a metal, in particular a light metal, such as an aluminum or an aluminum alloy, AlSiC, magnesium, a magnesium alloy, titanium, a titanium alloy, steel, stainless steel or high grade steel. Wherein the housing part has at least one opening through which at least one conductor is passed through in a glass or glass ceramic material, wherein the conductor has at least two sections in axial direction; a first section consisting of a first material and a second section consisting of a second material, as well as a transition from first to second material. According to the present invention, a pin-shaped conductor may be connected to an electrochemical cell or respectively a battery cell and consist of copper, as well as a different material on the outside, for example aluminum.

The present invention allows for several battery cells to be very easily interconnected, for example in that the conductors of the individual cells are connected with each other through a common component, for example an aluminum plate. By relocating the transition of the different conductive materials in the region of the glass or glass ceramic material, a contact corrosion is furthermore avoided which can occur if the transition is positioned outside the battery cell, or even inside the battery cell. The contact corrosion may be avoided because the feed-through is hermetically sealed in the region of the glass or glass ceramic. In the current example, hermetically sealed means that at a pressure differential of 1 bar a helium leakage rate of maximum $1 \cdot 10^{-8}$ mbar l $s^{-1}$ exists. This means that the helium leakage rate under all possible test conditions is always less than $1 \cdot 10^{-8}$ mbar l $s^{-1}$. The hermeticity ensures, that the transition is insulated and protected against corrosion. The hermeticity is achieved in that the seal of the conductor is a compression glass-to-metal seal. A compression glass-to-metal seal in contrast to an adapted seal is achieved if the thermal coefficient of expansion of the housing material as well as that of the conductive material is different to that of the glass material. The thermal coefficient of expansion of the glass material is herein lower than that of the housing material, so that a pressure can be built up by the housing material upon the glass material.

As previously described, the first material of the conductor which can be located on the outside of the conductor that is guided into the cell can be a light material, in particular aluminum, an aluminum alloy, AlSiC, but also magnesium, a magnesium alloy or another material. Selecting the first material, for example, as a light metal, such as aluminum or an aluminum alloy can allow for the easy weldability with the connecting material that can also be aluminum or an aluminum alloy, as well as provide a low weight.

The second, inward directed material, that is the material of the conductor or the pin section that protrudes into the battery can—if for example the conductor is connected to a cathode—be copper, a copper alloy or another material, adjusted to the cathode material in the battery cell. In the present invention, the cathode can be the positive terminal of the battery, since in a battery electric energy is transformed at the expense of another energy—in this case the chemical energy. In order to avoid corrosion of the pin, due to the different materials being exposed to air, provision can be made that the transition from the first material to the second material is located in the region of the glass or the glass ceramic material. A first arrangement of the invention provides that the glass ceramic material that surrounds the two-part pin including the transition point is one single material, whereby the material is selected so that it is adapted to the material of the first section, as well as to the material of the second section in regard to its thermal coefficient of expansion.

The material of the housing in whose opening the conductor is sealed can be a metal, in particular a light metal, such as aluminum, an aluminum alloy, AlSiC, magnesium, a magnesium alloy, titanium, steel, stainless steel or high grade steel. The aluminum or aluminum alloy can be used for the housing, which generally provides high strength.

One alternative embodiment provides that not only the conductor, but also the glass or glass ceramic material may also consist of two materials, thus resulting for example in a glass composite, whereby the first glass material is adapted to the thermal coefficient of expansion of the first section of the conductor, and the second glass material to the thermal coefficient of expansion of the second section of the pin shaped conductor.

In the present invention, adaptation of the glass materials may occur in such a manner that on the one hand, due to the compressive pressure of the glass material a reliable hermeticity is provided and that on the other hand cracks in the seal area are avoided.

The glass materials may include the following components in mol-%:

| | |
|---|---|
| $P_2O_5$ | 35-50 mol-%, for example 39-48 mol-% r |
| $Al_2O_3$ | 0-14 mol-%, for example 2-12 mol-% |
| $B_2O_3$ | 2-10 mol-%, for example 4-8 mol-% |
| $Na_2O$ | 0-30 mol-%, for example 0-20 mol-% |
| $M_2O$ | 0-20 mol-%, for example 12-20 mol-%, wherein M = K, Cs, can be Rb |
| PbO | 0-19 mol-%, for example 0-9 mol-% |
| $Li_2O$ | 0-45 mol-%, for example 0-40 mol-%, for example 17-40 mol-% |
| BaO | 0-20 mol-%, for example 0-20 mol-%, for example 5-20 mol-% |
| $Bi_2O_3$ | 0-10 mol-%, for example 1-5 mol-%, for example 2-5 mol-% |

The glass material may be selected in such a way that it has a coefficient of expansion α in the range of 20° C. to 300° C. ≥$13 \cdot 10^{-6}$/K, for example in the range of $13 \cdot 10^{-6}$/K to $25 \cdot 10^{-6}$/K, for example in the range of $13 \cdot 10^{-6}$/K to $23 \cdot 10^{-6}$/K, $13 \cdot 10^{-6}$/K to $20 \cdot 10^{-6}$/K, $13 \cdot 10^{-6}$/K to $19 \cdot 10^{-6}$/K, or $13 \cdot 10^{-6}$/K to $18 \cdot 10^{-6}$/K. Such a selection of the coefficient of expansion for the glass material may be used to obtain a compression glass-to-metal seal when the housing is for example aluminum or an aluminum alloy or when the pin material of the first section of the pin—for example on its outside—is aluminum and the material of the second section on its inside is copper. In such a case α is selected between $13 \cdot 10^{-6}$/K and less than $20 \cdot 10^{-6}$/K. Since the coefficient of expansion of aluminum is approximately $20 \cdot 10^{-6}$/K the aluminum of the housing exerts a compressive pressure upon a glass material of this type and thereby upon the sealing of the pin. Since the coefficient of expansion of Cu is approximately $18 \cdot 10^{-6}$/K, it is expected that use of a glass material having α<$18 \cdot 10^{-6}$/K results in that the conductor or respectively the contact pin shrinks during glass-to-metal sealing and no hermeticity of the glass-to-metal sealing is provided for the conductor or contact pin. Surprisingly it was noted that a hermetic compression glass-to-metal seal may also be achieved, when the glass composition is α<$18 \cdot 10^{-6}$/K, for example $15 \cdot 10^{-6}$/K to $17 \cdot 10^{-6}$/K. The hermetically sealed feed-through is achieved not only to the second section of the copper conductor, but also to the first aluminum section having an α of $23 \cdot 10^{-6}$/K. The difference or mismatch of the coefficient of expansion of the glass material relative to the aluminum is significantly greater than it is to the copper.

The glass material of the feed-through may be provided with a cover layer. The cover layer may take on different forms. The cover layer may include a glass material in the embodiment of a glass layer, for example a cover glass layer or it can be a plastic layer or a barrier coating, or a combination of several of the aforementioned layers. By applying the cover layer onto the glass material in which the conductor is sealed it is ensured that the sealing glass is not attacked by the electrolyte, for example hydrofluoric acid and does not corrode which is important for example with phosphate glasses that are less water resistant.

In another embodiment, provision may for example be made that the housing part is designed as thin as possible and that a reinforcement part or reinforcement region is designed only in the region of the feed-through to apply the necessary compressive pressure. This may facilitate saving of material costs.

The feed-through according to the present invention may be used in a housing, for example in a housing for an electric storage device which can be a battery or a capacitor. The invention therefore also provides a storage device, such as a battery or a capacitor with such a housing.

Through the aluminum conductor that is directed outward of the battery cell it is possible in a simple manner, to connect a multitude of individual battery cells into one single battery block that includes a multitude of battery cells. The present invention therefore also provides an arrangement, such as a battery block, including at least two storage devices according to the present invention, wherein at least two storage devices are connected electrically and/or mechanically with a connector, for example a plate consisting of a connecting material. The connecting material may be aluminum or an aluminum alloy.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
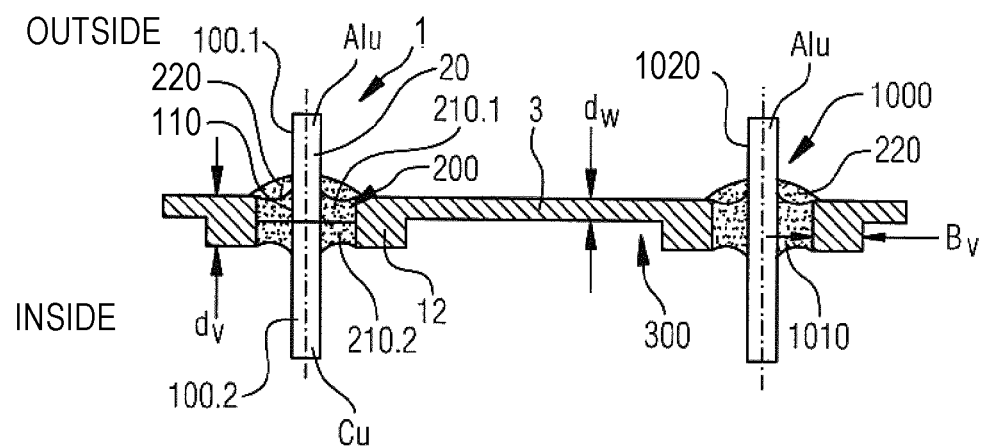
FIG. 1 illustrates a feed-through according to the present invention in a battery housing with a two-part conductor and a two-part glass material.

FIG. 1 illustrates a feed-through 1 according to the present invention, that is introduced into a housing, for example into a housing cover 3 of a storage cell housing, such as a battery cell housing.

The thickness of the housing cover is identified with dw. The battery cell housing or respectively housing cover 3 may be reinforced in the region of feed-through 1. In other words, it may feature a reinforcement region 12 whose thickness is considerably greater than the thickness of housing part dw. The thickness in the reinforcement region 12 is dv. The thickness dv of the reinforcement region 12 in this embodiment provides the glazing length for glass material 200.

In order to provide the necessary compression force, the reinforcement region 12 is wider in the region of the feed-through than the thickness dw. This means that width By of the reinforcement region 12 is greater than thickness dw of the housing cover 3.

In feed-through 1 that is connected to the cathode, the pin-shaped conductor is two-part, namely having a first section 100.1 and a second section 100.2. The first section 100.1 may consist of aluminum, and the second section 100.2 of the pin-shaped conductor may consist of copper. The copper pin directed in the storage device or respectively the battery cell may be connected to a cathode. A transition point 110 of pin-shaped conductor 20 consisting of two sections 100.1, 100.2 is provided in the region of glass-to-metal seal 200. The glass to metal seal 200 is made of at least one of a glass or glass ceramic material configured to seal an opening of the housing cover 3. In the embodiment illustrated in FIG. 1, glass-to-metal seal 200 consists of two materials. Namely, a first glass material 210.1 that is adapted to the material of first section 100.1 of the pin-shaped conductor, and a second glass material 210.2 that is adapted to second section 100.2 of pin-shaped conductor 20. Adaptation of the glass material occurs in such a way that, on the one hand, due to the compressive pressure of the glass material a reliable hermeticity is provided and that on the other hand cracks in the glazing are avoided.

The glass material may have a coefficient of expansion $\alpha$ in the range of 20° C. to 300° C. $\geq 13 \cdot 10^{-6}$/K, for example in the range of $13 \cdot 10^{-6}$/K to $25 \cdot 10^{-6}$/K.

The following table illustrates examples of glass compositions that are characterized by a thermal coefficient of expansion in the range of $13 \cdot 10^{-6}$/K to $20 \cdot 10^{-6}$/K. Whereas the thermal coefficient of expansion for examples AB1 and AB8 is clearly greater than that for copper with $\alpha = 18 \cdot 10^{-6}$/K—which is why the glasses can be suitable for a hermetic compression glass-to-metal seal. Examples AB2, AB3, AB4, AB5, AB6, AB7 are below $18 \cdot 10^{-6}$/K. Although such a value for α does not encourage expectations of a hermetically sealed feed-through because of shrinkage processes with conductors consisting of copper, it was surprisingly noted that even these materials are suitable for a hermetic compression glass-to-metal seal.

TABLE 1

| Mol-% | Examples: | | | | | | | |
|---|---|---|---|---|---|---|---|---|
| | AB1 | AB2 | AB3 | AB4 | AB5 | AB5 | AB7 | AB8 |
| $P_2O_5$ | 47.6 | 43.3 | 43.3 | 43.3 | 37.1 | 40.0 | 42.0 | 46.5 |
| $B_2O_3$ | 7.6 | 4.8 | 4.7 | 4.8 | 4.9 | 6.0 | 6.0 | 7.6 |
| $Al_2O_3$ | 4.2 | 8.6 | 8.7 | 2.0 | 2 | 12.0 | 12.0 | 4.2 |
| $Na_2O$ | 28.3 | 17.3 | | | | 15.0 | 16.0 | 28.3 |
| $K_2O$ | 12.4 | 17.3 | 17.3 | | | 18.0 | 19.0 | 12.4 |
| PbO | | | | | | 9.0 | | |
| BaO | | 8.7 | 8.7 | 15.4 | 14 | | | |
| $Li_2O$ | | | 17.3 | 34.6 | 42.1 | | | |

TABLE 1-continued

| Mol-% | AB1 | AB2 | AB3 | AB4 | AB5 | AB5 | AB7 | AB8 |
|---|---|---|---|---|---|---|---|---|
| $Bi_2O_3$ | | | | | | | 5.0 | 1 |
| Hemispherical Temperature (° C.) | 513 | 554 | 564 | 540 | 625 | | 553 | 502 |
| α(20-300° C.) ($10^{-6}$/K) | 19 | 16.5 | 14.9 | 13.7 | 14.8 | 16.7 | 16 | 19.8 |
| Tg (° C.) | 325 | 375 | 354 | 369 | 359 | 392 | 425 | 347 |
| Density [g/cm³] | 2.56 | | | | | 3 | 3.02 | 2.63 |
| Leaching In Ma-% | 18.7 | 14.11 | 7.66 | 12.63 | 1.47 | 3.7 | 29.01 | 8.43 |
| Weight loss (%) after 70 h in 70° C. water | 10.7 | 0.37 | 0.1 | 0.13 | 0.13 | n.B. | 0.006/0.001 | 0.45/0.66 |

In addition to low leaching the glasses are also characterized by high water resistance.

Example 1 (AB1) in table 1 can be suitable for aluminum/aluminum-glass seals, that is for sealing an aluminum pin as the conductor into a surrounding aluminum base body.

Example 6 in table 1 can be suitable for Cu/Al-glass seals, that is for sealing a copper pin as the conductor into a surrounding aluminum base body.

Even though some of the examples have a coefficient of expansion that tends to be too low for joining with Cu it has become clear that high Li contents can be dissolved in the melt, without the glass becoming unstable with such a glass composition.

Surprisingly it was shown that the water resistance can be clearly increased with $Bi_2O_3$. By introducing 1 mol-% $Bi_2O_3$, ten-times higher water resistance could be achieved in example 8 (AB8) compared to example 1 (AB1) at essentially the same alkali content. This is surprising to the expert.

$Bi_2O_3$ can also be used in place of PbO, according to example 6 (AB6). Since lead is environmentally harmful, glass compositions may be used that, except for contaminants are free of PbO, which is such where PbO can be set at mol-0%. In this application "free of PbO except for contaminants" means that less than 100 ppm, for example less than 10 ppm, for example less than 1 ppm of the respective substance—for example lead—is contained in the glass.

Feed-through 1 has a cover layer 220 that includes the glass or glass material into which the pin-shaped conductor is glazed with the transition.

Cover layer 220 can include a glass material or a plastic material over a coating. The cover layer ensures that glasses that are susceptible to corrosion—such as the first glass material 210.1 which can for example be a phosphate glass—are protected and are attacked less, for example by water.

It is conceivable, although not illustrated, to arrange a cover glass on the side of the glass that faces inside 300 of the storage device to protect for example second glass material 210.2 against attack of the electrolyte, for example HF.

By moving transition 110 from first glass material 100.1 to second glass material 100.2 into the glass or respectively the glass ceramic material 200 it is ensured, that no local element is formed and corrosion occurs on the metals of conductor 20.

Second feed-through 1000 illustrated in FIG. 1 through housing cover whose conductor is connected to the anode does not include a two-part conductor consisting of different materials, but instead one conductor 1020 consisting of one single material, namely aluminum, that can be connected to the anode. The glass material is also one single material and is identified with 1010. This material may also be provided with a cover layer 220.

Figure 2:
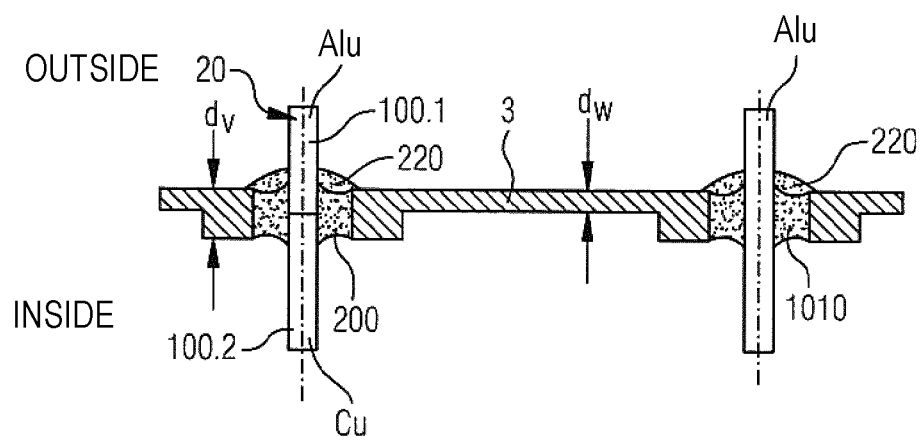
FIG. 2 illustrates another embodiment of a battery cell housing with a feed-through according to the present invention, with a two-part conductor and a single glass material.

FIG. 2 illustrates another embodiment of the invention, wherein again a two-part glass pin 20, as shown in FIG. 1 is inserted in a feed-through, wherein the feed-through includes only one single glass or glass ceramic material. Two-part pin 20 includes again two regions 100.1, 100.2—a first region 100.1 that can consist of aluminum and a second region 100.2 that can consist of copper and is connected to a cathode.

In this embodiment, the cathode is the positive terminal of a battery cell, since in a battery cell electric energy is transformed at the expense of another energy—in this case the chemical energy.

As is the case in the embodiment of the present invention in FIG. 1, housing cover 3 has a thickness dw, that may be thinner than in the region of the glass-metal seal in which a reinforcement region is provided.

Identical components in FIG. 1. and in FIG. 2 are identified with the same reference characters.

The invention provides an incentive feed-through that includes the same materials on the outside of the housing of the storage device, for example aluminum, whereas for materials of the conductor that is directed into the cell, different materials can be used. This has the advantage that on the outside of the housing of a storage device always the same connections can be used. Hereby, aluminum connection can for example be provided on the outside of the battery cell that can easily be welded together with other materials, such as aluminum. If, according to the invention aluminum is used on the outside of the battery, aluminum is welded to aluminum, resulting in high process reliability. Furthermore, a robust stable manufacturing process can be ensured. A connection produced in this manner is especially durable and fatigue-free. By bringing the transition of first and second pin material or respectively conductor material into the glass material, corrosion of the conductor consisting of different materials—that is contact corrosion—is prevented.

The present invention includes the following aspects:

Feed-through (1), in particular through a housing part (3) of a housing, for example of a storage device and for example of a battery or a capacitor made of a metal, in particular a light metal, such as aluminum or an aluminum alloy, AlSiC, magnesium, a magnesium alloy, titanium, steel, stainless steel or high grade steel, wherein housing part (3) has at least one opening through which at least one conductor (20) is passed through in a glass or glass ceramic material (200). Characterized in that conductor (20) has at least two sections in axial direction; a first section (100.1) consisting of a first material and a second section (100.2) consisting of a second material, as well as a transition (110) from first to second material.

The first material can be a light material, such as aluminum, an aluminum alloy, AlSiC, magnesium, a magnesium alloy or another material.

The second material describe above may be a metal, such as copper or a copper alloy.

The transition (110) from the first material to the second material may be located in the region of the glass or glass ceramic material (200).

The glass or glass ceramic material can be a single material that has a thermal coefficient of expansion α that is adapted to the material of first section (100.1) of the conductor and to the material of second section (100.2) of the conductor and that can be in the range of $13 \cdot 10^{-6}/K$ to $25 \cdot 10^{-6}/K$.

The glass or glass ceramic material may consist of two materials, a first glass or glass ceramic material (210.1) and a second glass or glass ceramic material (210.2). The first glass material (210.1) may be adapted to the thermal coefficient of expansion of the first section (100.1) and second glass material (210.2) may be adapted to the thermal coefficient of expansion of the second section (100.2).

The glass material (200) can include at least one cover layer (220), for example a glass layer, such as a cover glass layer, a plastic layer or a barrier coating, or a combination of several of the aforementioned layers.

The housing can have a housing thickness dw and in the region of the opening can include a reinforcement component or a reinforcement section so that the housing thickness and the reinforcement component thickness or respectively the reinforcement section thickness provides a glass-seal length (EL) of the glass or glass ceramic material into the housing or the housing component.

The present invention also includes the aspect of a housing, for example a housing for an electric storage device, such as a battery or a capacitor having a feed-through according to any of the aforementioned aspects of the present invention.

The present invention also includes the aspect of a storage device, such as a battery or capacitor, with a housing or housing part according to the aforementioned housing.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A feed-through through a housing part of a housing of a storage device including a battery or a capacitor made of a metal including a light metal composed of at least one of aluminum, an aluminum alloy, AlSiC, magnesium, a magnesium alloy, titanium, steel, stainless steel, and high grade steel, said housing part has at least one opening, the housing has an outside and an inside, said feed-through comprising:

at least one glass or glass ceramic material configured to seal the at least one opening of the housing part; and
at least one conductor passing in the at least one glass or glass ceramic material through the at least one opening of the housing part, said at least one conductor including:
at least two sections in an axial direction including a first section consisting of a first material and a second section consisting of a second material, said first material is a light material composed of at least one of aluminum, an aluminum alloy, AlSiC, magnesium, and a magnesium alloy, and
a transition from the first material to the second material, said transition is located in a region of said at least one glass or glass ceramic material, wherein said at least one glass or glass ceramic material is selected such that a compression glass-to-metal seal is provided, wherein the second material is composed of copper or a copper alloy, wherein the first material is directed toward the outside of the housing and the second material is directed toward the inside of the housing.

2. The feed-through according to claim 1, wherein said at least one glass or glass ceramic material has a thermal coefficient of expansion in the range of $13 \cdot 10^{-6}/K$ to $25 \cdot 10^{-6}/K$.

3. The feed-through according to claim 2, wherein said at least one glass or glass ceramic material is selected so that the thermal coefficient of expansion is in the range of at least one of $13 \cdot 10^{-6}/K$ to $23 \cdot 10^{-6}/K$, $13 \cdot 10^{-6}/K$ to $20 \cdot 10^{-6}/K$, $13 \cdot 10^{-6}/K$ to $19 \cdot 10^{-6}/K$, and $13 \cdot 10^{-6}/K$ to $18 \cdot 10^{-6}/K$.

4. The feed-through according to claim 1, wherein said at least one glass or glass ceramic material comprises the following components in mol-%:

| | |
|---|---|
| $P_2O_5$ | 35-50 mol-% |
| $Al_2O_3$ | 0-14 mol-% |
| $B_2O_3$ | 2-10 mol-% |
| $Na_2O$ | 0-30 mol-% |
| $M_2O$ | 0-20 mol-%, wherein M = K, Cs, can be Rb |
| PbO | 0-19 mol-% |
| $Li_2O$ | 0-45 mol-% |
| BaO | 0-20 mol-% |
| $Bi_2O_3$ | 0-10 mol-% |

5. The feed-through according to claim 1, wherein said at least one glass or glass ceramic material comprises the following components in mol-%:

| | |
|---|---|
| $P_2O_5$ | 39-48 mol-% |
| $Al_2O_3$ | 2-12 mol-% |
| $B_2O_3$ | 4-8 mol-% |
| $Na_2O$ | 0-20 mol-% |
| $M_2O$ | 12-20 mol-%, wherein M = K, Cs, can be Rb |
| PbO | 0-9 mol-% |
| $Li_2O$ | 0-40 mol-% |
| BaO | 0-20 mol-% |
| $Bi_2O_3$ | 1-5 mol-% |

6. The feed-through according to claim 1, wherein said at least one glass or glass ceramic material comprises the following components in mol-%:

| | |
|---|---|
| $P_2O_5$ | 39-48 mol-% |
| $Al_2O_3$ | 2-12 mol-% |
| $B_2O_3$ | 4-8 mol-% |

-continued

| | |
|---|---|
| Na$_2$O | 0-20 mol-% |
| M$_2$O | 12-20 mol-%, wherein M = K, Cs, can be Rb |
| PbO | 0-9 mol-% |
| Li$_2$O | 17-40 mol-% |
| BaO | 5-20 mol-% |
| Bi$_2$O$_3$ | 2-5 mol-% |

7. The feed-through according to claim 1, wherein said at least one glass or glass ceramic material is a single material that has a thermal coefficient of expansion that is adapted to the first material of the first section of the at least one conductor and to the second material of the second section of the at least one conductor.

8. The feed-through according to claim 1, wherein said at least one glass or glass ceramic material consists of two materials including a first glass or glass ceramic material and a second glass or glass ceramic material, wherein the first glass or glass ceramic material is adapted to a thermal coefficient of expansion of the first section of the at least one conductor and the second glass or glass ceramic material is adapted to a thermal coefficient of expansion of the second section of the at least one conductor.

9. The feed-through according to claim 1, wherein said at least one glass or glass ceramic material includes at least one cover layer in the form of at least one of a glass layer, a cover glass layer, a plastic layer, and a barrier coating.

10. The feed-through according to claim 1, wherein the housing has a housing thickness dw, and in a region of the at least one opening includes a reinforcement component or a reinforcement section each respectively having a thickness so that the housing thickness and the reinforcement component thickness or respectively the reinforcement section thickness provide a glass-seal length of the at least one glass or glass ceramic material into the housing.

11. A housing for an electric storage device including a battery or a capacitor, said housing having at least one opening, the housing having an outside and an inside, and comprising:
a feed-through, including:
at least one glass or glass ceramic material configured to seal the at least one opening of the housing; and
at least one conductor passing in the at least one glass or glass ceramic material through the at least one opening of the housing, said at least one conductor including:
at least two sections in an axial direction including a first section consisting of a first material and a second section consisting of a second material, said first material is a light material composed of at least one of aluminum, an aluminum alloy, AlSiC, magnesium, and a magnesium alloy, and
a transition from the first material to the second material, said transition is located in a region of said at least one glass or glass ceramic material, wherein said at least one glass or glass ceramic material is selected such that a compression glass-to-metal seal is provided, wherein the second material is composed of copper or a copper alloy, wherein the first material is directed toward the outside of the housing and the second material is directed toward the inside of the housing.

12. A storage device including a battery or a capacitor, having a housing with at least one opening, the housing has an outside and an inside, said storage device comprising:
a feed-through, including:
at least one glass or glass ceramic material configured to seal the at least one opening of the housing; and
at least one conductor passing in the at least one glass or glass ceramic material through the at least one opening of the housing, said at least one conductor including:
at least two sections in an axial direction including a first section consisting of a first material and a second section consisting of a second material, said first material is a light material composed of at least one of aluminum, an aluminum alloy, AlSiC, magnesium, and a magnesium alloy, and
a transition from the first material to the second material, said transition is located in a region of said at least one glass or glass ceramic material, wherein said at least one glass or glass ceramic material is selected such that a compression glass-to-metal seal is provided, wherein the first material is directed toward the outside of the housing and the second material is composed of copper or a copper alloy and is directed toward the inside of the housing.

13. The storage device according to claim 12, further including an arrangement having at least two storage devices connected electrically or mechanically with a connecting piece in the form of a plate consisting of a connecting material.

14. The storage device according to claim 13, wherein the connecting material is aluminum or an aluminum alloy.

* * * * *

UNITED STATES PATENT AND TRADEMARK OFFICE
CERTIFICATE OF CORRECTION

PATENT NO. : 10,541,392 B2  
APPLICATION NO. : 15/485908  
DATED : January 21, 2020  
INVENTOR(S) : Hartl Page 1 of 1

It is certified that error appears in the above-identified patent and that said Letters Patent is hereby corrected as shown below:

In the Specification

Column 2
At Line 42, please delete "Pt/Ir,", and substitute therefore --Pt/lr--.

Column 3
At Line 21, please delete "1-$10^{-8}$ mbar", and substitute therefore --1·$10^{-8}$ bar--.

Column 6
At Line 13, please delete "By", and substitute therefore --Bv--; and
At Line 49, please delete "for a does", and substitute therefore --for α does--.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*